United States Patent [19]

Kobayashi et al.

[11] Patent Number: 4,980,221

[45] Date of Patent: Dec. 25, 1990

[54] PERMEATION PRINTED PLASTIC BODY

[75] Inventors: Kazuhiro Kobayashi; Hifumi Kouguthi; Toshio Hara, all of Chiba, Japan

[73] Assignee: Denki Kagaku Kogyo Kabushiki Kaisha, Tokyo, Japan

[21] Appl. No.: 174,065

[22] Filed: Mar. 28, 1988

[30] Foreign Application Priority Data

Mar. 7, 1988 [JP] Japan .................................. 63-51572

[51] Int. Cl.$^5$ ......................... B32B 3/00; B32B 31/00; D06P 1/02

[52] U.S. Cl. ..................................... 428/195; 428/207; 8/471; 40/625; 156/230

[58] Field of Search ............... 428/195, 203, 204, 260, 428/908.8, 913.3, , 142, 207; 283/67, 37; 40/625, 626, 594, 595; 8/467, 468, 469, 470, 471, 472; 156/230, 249, 241, 540, 541

[56] References Cited

U.S. PATENT DOCUMENTS

| | | | |
|---|---|---|---|
| 841,321 | 1/1907 | Howard | 40/625 |
| 4,253,838 | 3/1981 | Mizuno et al. | 8/471 |
| 4,362,529 | 12/1982 | Mizuno et al. | 8/471 |
| 4,626,256 | 12/1986 | Kawasaki et al. | 428/914 |

FOREIGN PATENT DOCUMENTS

| | | |
|---|---|---|
| 58-155957 | 9/1983 | Japan . |
| 59-182779 | 10/1984 | Japan . |
| 59-199251 | 11/1984 | Japan . |
| 59-199283 | 11/1984 | Japan . |
| 60-30344 | 2/1985 | Japan . |

OTHER PUBLICATIONS

Polymer Handbook, 2nd Ed., Brandrup et al., J. Wiley & Son, NY, NY, 1975 pages in section IV.
Jupp-344; Abstract JA 60-30344, p. 160, M 391.
Jupp-283; Abstract JA 59-199283, p. 65, M 366.
Jupp 779; Abstract JA 59-182779, p. 54, M 359.
Jupp-957; Abstract JA 58-155957, p. 69, M 262.
Jupp-251; Abstract JA 59-199251, p. 56, M 366.

*Primary Examiner*—Michael W. Ball
*Assistant Examiner*—Louis Falasco
*Attorney, Agent, or Firm*—Sprung Horn Kramer & Woods

[57] ABSTRACT

A plastic article such as key tops of a key board needs wear resistant printing. This is attained in a styrene-based resin body suitable for such an article including key tops, by a process for permeation printing, comprising the steps of printing an article with an ink comprising a medium having a solubility parameter of 8.5 to 11.5 $(cal/cc)^{\frac{1}{2}}$ and then closing the printed surface of the article to permeate the ink into the article. Further, a system suitable for permeation printing a plastic article is provided which comprises a transfer-type printing device and a body heating and covering device, the body heating and covering device comprising a covering body which is heated and covers the printed surface of the plastic article to cause ink permeate into the plastic article.

11 Claims, 13 Drawing Sheets

PERMEATION PRINTED PLASTIC BODY

BACKGROUND OF THE INVENTION

1. Field of the Invention

The present invention relates to a permeation printed plastic body and a process and a system for conducting such a permeation printing, particularly to a styrene-based resin body.

2. Description of the Related Art

The printing of a plastic or synthetic resin article is carried out by hot stamp printing, silk screen printing, tampon printing, etc. For example, in devices such as a calculator, a pushphone, a television, a radio, a video player, a car stereo, and a computer, a number of push button type switches are arranged. Since the printed surfaces of these button switches are frequently pushed during operation of the device, the printing must be resistant to wear caused by friction and the letters, marks and figures must remain clear for a long time. However, prints obtained by methods such as hot stamp printing, silk screen printing, etc., of the prior art are less resistant to wear and are worn away by repeated push friction and finally completely worn away. Therefore, the development of process for providing a shaped plastic article having an excellent wear resistant print is desired.

Recently, permeation printing methods in which an ink image is formed or printed on a shaped surface of a plastic article and then permeated into the plastic article by heating have been proposed (for example, Japanese Unexamined Patent Publication (Kokai) Nos. 60-30344 and 59-199283). A modification of the permeation printing method has been proposed, in which a paper is placed on an ink image formed on a surface of a shaped article to absorb excess ink (Japanese Unexamined Patent Publication (Kokai) No. 59-199283). Another modification of a permeation printing method was proposed in which a dye migration-prevention layer of a water soluble resin is provided on an ink image formed on a surface of a shaped plastic article before heat migration of ink into the article (Japanese Unexamined Patent Publication (Kokai) No. 59-182779). However, these methods are primitive and not particularly suitable in practice for providing an excellent printing on a shaped article such as the top of a key button made of a polystylene-based resin.

Also, a transfer printing method was proposed in which a transfer sheet having patterns such as letters, marks or figures of a sublimating ink is brought into close contact with a shaped article of a polyester resin such as polybutyleneterephthalate (PBT), and then heated to print the letters, marks and figures on the shaped article by permeation (Japanese Unexamined Patent Publication (Kokai) Nos. 58-155957 and 59-199251). By selecting a suitable dye, a wear resistant printing is possible, but the formation of a shaped article of a polyester resin requires a high level injection molding technique and polyester resins are expensive compared with general purpose resins including a styrene-based resin.

On the other hand, if this transferring printing method for a polyester based resin is applied to a styrene-based resin, a high transfer temperature required due to a high molecular weight of a dye may often cause deformation of a styrene-based resin although such a high temperature does not cause deformation of a polyester resin. If transfer printing is conducted at a relatively low temperature, to prevent deformation of a polystyrene-based resin, an insufficient ink permeation depth is obtained and the wear resistance of the print is unsatisfactory. Further, the transfer printing method for a polyester-based resin does not provide a practically satisfactory print on a styrene-based resin.

A first object of the present invention is to provide a permeation printing method for a styrene-based resin, which can be conducted at a low temperature such that the styrene-based resin is not deformed and a sufficient ink permeation depth is attained.

Again referring to the transfer permeation printing method for a polyester-based resin, this method uses a transfer sheet in which dye patterns are printed in advance. Therefore, if contact of a transfer sheet with a resin is not uniform during a time that the dye sublimates and migrates from the transfer sheet to the resin, the transferred patterns may spread and be blurred by diffusion of the dye into air, so that the periphery of the patterns becomes unclear.

Moreover, the contents of the patterns which can be obtained on a printed resin are the same as the contents illustrated on a transfer sheet. As a result, when patterns printed on a key board are to be changed, the patterns of a transfer sheet must be changed, which disadvantageously necessitates the preparation of a changed transfer sheet.

Furthermore, in the transfer permeation method, the cost of the production of a key board becomes disadvantageously extremely expensive when the key board is to be manufactured in a small lot.

Furthermore, in the transfer permeation method, a transfer sheet is brought into contact with key tops and heating is effected from above the transfer sheet. If a transfer is conducted while keeping the key tops at a room temperature, key tops made of a resin are expanded and contracted by the heating from above the transfer sheet and slippage of the transferring sheet occurs as the temperature of the key tops increases, since the thermal expansion coefficients of the transfer sheet and the key tops are different. As a result, an insufficient coloration of the periphery, divergence of patterns, and blurred patterns appear. Therefore, a preliminary heating of key tops is necessary and an apparatus for this printing should comprise a preliminary heating unit and a heating unit for a transfer sheet from above thereof, which is a disadvantageously industrially complicated apparatus.

The second object of the present invention is to provide a simple system for a permeation printing of a shaped plastic article, which allows clear patterns to be stably printed at a high rate irrespective of the shape of the plastic article.

SUMMARY OF THE INVENTION

The above and other objects, features and effects of the present invention are attained by a process for the permeate printing of a styrene-based resin body having a shaped surface, this process comprising the steps of: forming an ink image on the shaped surface of the styrene-based resin body with an ink comprising an oil-soluble dye and a solvent having a solubility parameter in a range of 8.5 to 11.5 $(cal/cc)^{\frac{1}{2}}$; and causing the ink to permeater into the styrene-based body at a temperature which does not cause deformation of the styrene-based resin body while preventing evaporation of the ink;

whereby a printed styrene-based resin body in which the ink is permeated is obtained.

In a preferred embodiment of the present invention, there is particularly provided a process for the permeation printing of key tops, the key tops being made of a styrene-based resin and having a curved surface, this process comprising the steps of: forming an ink image on the curved surfaces of the key tops with an ink comprising an oil-soluble dye and a solvent having a solubility parameter in a range of 8.5 to 11.5 $(cal/cc)^{\frac{1}{2}}$; and covering the curved surfaces of the key tops with a covering body having a surface approximately complementary to the curved surfaces of the key tops so that evaporation of the ink is prevented during the time in which the ink permeates into the key tops, at a temperature in a range not causing deformation of the key tops; whereby printed key tops in which the ink is permeated are obtained.

In accordance with the present invention, there is provided a permeation printed resin body, comprising: a styrene-based resin body having a shaped surface; and an image-forming dye permeated from the shaped surface into the resin body, the dye being an oil-soluble dye, a depth of permeation of the dye being at least 10 μm.

In accordance with the present invention, there is also provided a system for the permeation printing of a plastic body having a shaped surface, this system comprising:

(A) a first device for forming an ink image on the shaped surface of the plastic body from an intaglio matrix having image-forming intaglio grooves, the first device including: (i) means for selectively inking the intaglio grooves of the intaglio matrix; (ii) a printing pad having a surface to which ink adheres but is not absorbed; (iii) means for pressing the printing pad onto the inked surface of the intaglio matrix to force the image-forming ink into the intaglio grooves, from the printing pad; (iv) means for bringing the printing pad into contact with the shaped surface of the plastic body to transfer the image-forming ink from the printing pad to the plastic body; and (v) means for transferring the printing pad between the intaglio matrix and the plastic body; and (B) a second device for causing the image-forming ink to permeate into the plastic body, said second device including: (i) a covering pad having a surface approximately complementary to the shaped surface of the plastic body; and (ii) means for bringing the covering pad into close contact with the shaped surface of the plastic body to cover the shaped surface so that evaporation of the ink from the shaped surface of the plastic body is prevented while the ink permeates into the plastic body to form a permeated ink image on the shaped surface of the plastic body.

In a preferred embodiment of the present invention, the second device further includes: (iii) means for heating the covering pad; and (iv) means for transferring the covering pad between the heating means and the plastic body.

PREFERRED EMBODIMENTS OF THE INVENTION

Figure 1:
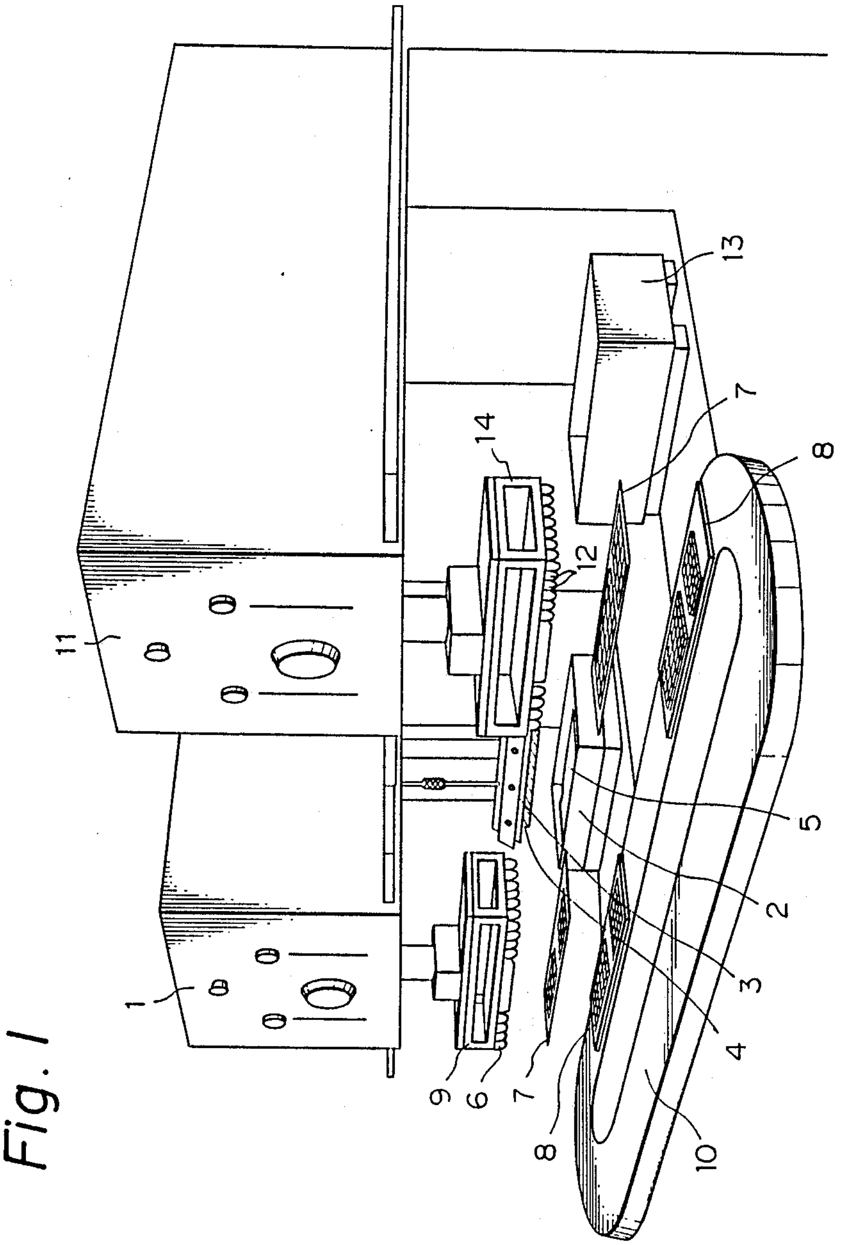
FIG. 1 is a perspective view of the main portion of a system for permeation printing according to the present invention.

The process for the permeation printing of a shaped surface of a styrene-based resin body is described in more detail as follows:

The styrene-based resin of a shape article, particularly key tops used in the process of the present invention includes styrene resin, AS resin (acrylonitrile-styrene copolymer resin), ABS resin (acrylonitrile-butadiene-styrene copolymer resin), AAS resin (acrylonitrile-acrylate-styrene copolymer resin), ACS resin (acrylonitrile-chlorinated polyethylene-styrene copolymer resin), and AES resin (acrylonitrile-EP (ethylene-propylene) rubber-styrene copolymer resin). The styrene-based resin considered in the present invention farther includes modified styrene-based resins, such as a partially or wholly α-methyl styrene substituted resin, a partially or wholly methacrylonitrile-substituted acrylonitrile copolymer resin, and a resin copolymerized with methyl methacrylate, ethyl acrylate, buthyl acrylate, N-phenyl malic imide, etc. ABS resin is particularly preferred.

The ink solvent used in the present invention preferably has a solubility parameter in a range of 8.5 to 11.5 $(cal/cc)^{\frac{1}{2}}$. Here, the solubility parameter is defined by the solubility parameter values described on pages IV-337 to IV-359 in "Polymer Handbook" (edited by J. Brandrup and E. H. Immergut, published by John Willy & Science, N.Y. 1975, Second ed.) and by calculating solubility parameter $\delta_T$ of a mixture of n solvents from the following formula (1):

$$\delta_T = \sum_{i=1}^{n} \delta_i f_i / \sum_{i=1}^{n} f_i \ (cal/cc)^{\frac{1}{2}} \quad (1)$$

where $\delta_i$ stands for a solubility parameter of each solvent of the n solvents and $f_i$ stands for a rate of the weight of each solvent based on the total weight of the n solvents. If a solvent having a solubility parameter of less than 8.5 $(cal/cc)^{\frac{1}{2}}$ or larger than 11.5 $(cal/cc)^{\frac{1}{2}}$ is used and permeation printing is effected on a styrene-based resin article, fine cracks may appear on the printed surface of the article, or the ink will not sufficiently permeate into the article, and thus the resultant printed patterns are disadvantageously less wear resistant. Further, some of the ink does not permeate into the article but remains on the surface of the article. A solvent having a solubility parameter of 8.5 to 11.5 $(cal/cc)^{\frac{1}{2}}$ provides a high permeability of an ink and a high resistance of printed patterns on a styrene-based resin article. A preferred range of the solubility parameter is from 9.0 $(cal/cc)^{\frac{1}{2}}$ to 11.0 $(cal/cc)^{\frac{1}{2}}$, more preferably from 9.5 $(cal/cc)^{\frac{1}{2}}$ to 10.5 $(cal/cc)^{\frac{1}{2}}$.

The preferred ink solvent used in the present invention includes ethers such as 2-methoxyethanol, 2-ethoxyethanol, 2-butoxyethanol, 2-(hexyloxy)ethanol, 2-phenoxyethanol and 2-(benzyloxy)ethanol; alcohol having two functionalities; aromatic hydrocarbons such as benzene, toluene (ortho-, meta-, para-)xylene, ethylbenzene, isopropylbenzene, and mesitylene; ketons such as actone, methylethylketon, methylethylketon, and diethylketon; acetic acid esters such as methyl acetate, ethyl acetate, propyl acetate, isopropyl acetate, butyl acetate, isobutyl acetate, sec-butyl acetate, pentyl acetate, and isopentyl acetate; methyl formate, ethyl formate, propyl formate, butyl formate, isobutyl formate, and pentyl formate; propionic acid esters such as methyl propionate, ethyl propionate, butyl propionate, and isopentyl propionate; butyric acid esters such as methyl butyrate, ethyl butyrate, and butyl butyrate, alcohols such as methanol, ethanol, 1-propanol, 2-propanol, 1-butanol, 2-butanol, isobutylalcohol, tert-butylalcohol, 1-pentanol, 2-pentanol, 3-pentanol, 2-methyl-1-butanol, isopentylalcohol, tert-pentylalcohol, 3-methyl-2-butanol, neopentylalcohol and 1-hexanol; and ethers such as diethylether, dipropylether, and anisole. These solvents include solvents having a solubility parameter outside the range of the 8.5 to 11.5 $(cal/cc)^{\frac{1}{2}}$, which however may be used in a mixed solvent. Examples of such a solvent are methanol and ethanol.

Here, although the term "solvent" is used and all or most of a dye is solved in the solvent in an ink in the present invention, a poison of a dye may be dispersed in the solvent of the ink.

The method for forming an ink image on a shaped surface of a styrene-based resin article is not particularly limited and includes brush printing, silk screen printing, tampon printing, dry offset printing, and pad printing. When the shaped surface of an article is relatively flat, screen printing and dry offset printing may be used. When the shaped surface of an article is considerably curved, tampon printing and pad printing are preferably used. Tampon printing is particularly preferably used. A tampon printing is described in U.S. Pat. No. 4,060,031, which is incorporated here by reference.

The formed ink image is then caused to permeater into the article of a styrene-based resin, while evaporation of the ink from the surface of the article is prevented. According to the present invention, the surface of an article on which an ink image is formed is closed. To close the surface of an article, according to the present invention, the article is placed in a closed system such as an autoclave or a pressure container in which the partial pressure of the solvent is made as high as, for example, 10 $kg/cm^2$ (more than 10 $kg/cm^2$ may be used but the effect thereof is not increased). Alternatively, the ink image-formed surface of an article is covered with a covering material to prevent evaporation of the ink. The covering material may be, for example, glass, ceramics, metals and a synthetic rubber, e.g., a silicone rubber, into which a gas or liquid can not easily permeate. In these measures of closing the surface of an article, the solvent on the closed surface of an article diffuses into the resin of the article or the ink permeates into the resin of the article.

Here, the term "permeate" means that an image-forming ink on a shaped surface of an article permeates into the article to a reasonable depth. The depth of permeation of the ink into a styrene-based resin article depends on covering time, temperature, pressure, amount of solvent in ink and is generally at least 10 μm, preferably from 20 μm to 200 μm, more preferably from 30 μm to 100 μm.

While the ink image surface of an article is closed, the ink is caused to permeate into the article, and the conditions of the permeation are not particularly limited. Heating may accelerate the permeation rate or shorten the permeation time, but preferably is within a temperature range which does not cause deformation of a styrene-based resin article.

Such a temperature range is from 20° C. to 180° C., more preferably from 70° C. to 180° C., although the preferable temperature range depends on the concentration of dye in the ink. When the temperature is lower than 20° C., the rate of permeation is low. When the temperature is higher than 180° C., the article of a styrene-based resin may be deformed.

The ink used in the present invention is not particularly limited as long as the dye is an oil-soluble dye and the solvent has a solubility parameter of 8.5 to 11.5 $(cal/cc)^{\frac{1}{2}}$. However, when the ink contains a surfactant, a stabilizer, etc., the resultant solvent containing such additives preferably has a solubility parameter of 8.5 to 11.5 $(cal/cc)^{\frac{1}{2}}$. The dye should be oil-soluble dye, and is generally preferable to be sublimating at a lower temperature and has a relatively small molecular weight, to have a high premeability. The ink usually should contain a polymer.

Thus, according to a process of the present invention, an ink can be permeated into a styrene-based resin article to a depth sufficient to make the print wear resistant, at a temperature which does not cause deformation of a styrene-based resin article.

Next, the system for the permeation printing of a shaped surface of a plastic body, particularly curved surfaces of key tops according to the present invention is described below with reference to the drawings. This example of a system according to the present invention relates to a system for the permeation printing of a key board, but the present invention may applied to other plastic articles, for example, push buttons of a phone, calculation keys, a camera body, etc.

Figure 5:
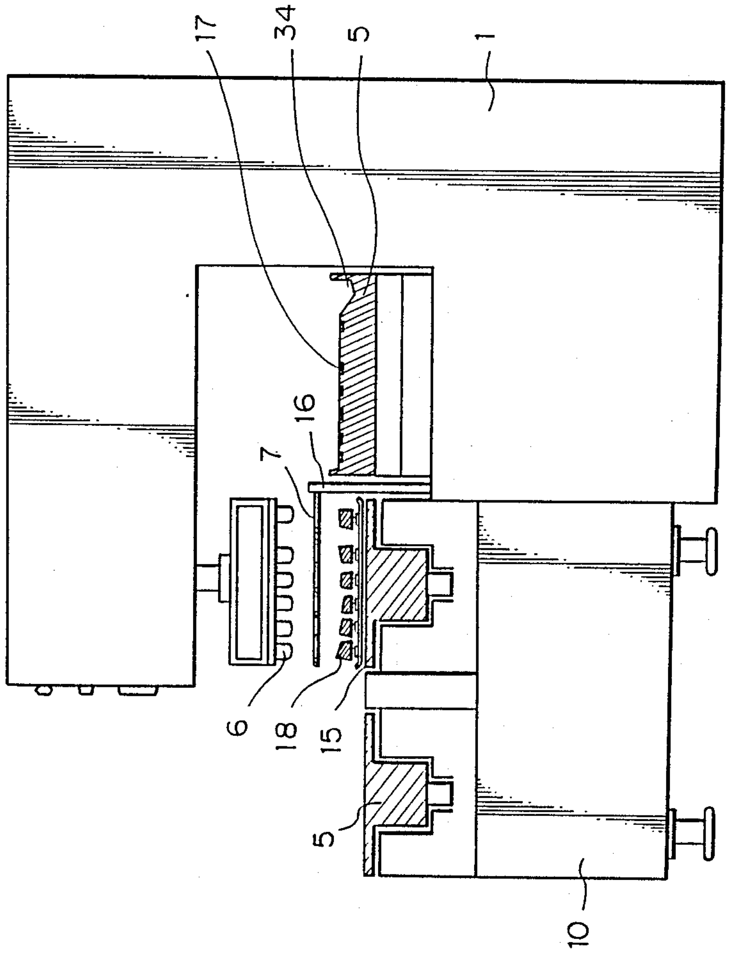
FIG. 5 is a sectional view of a device for forming an ink image on a shaped surface with a transferring pad.

In FIG. 1, a key board 8 fixed to a conveyer 10 is stopped at a position or stage of a transfer-type curved surface printing device 1. An intaglio matrix 5 fixed to an ink plate 2 is inked with an ink raking member 4. The intaglio matrix 5 has an image of intaglio grooves or negatively etched depressions, which image is to be printed onto a key board 8. Then, a blade 3 is moved across the intaglio matrix 5 to remove excess ink and an image-forming ink selectively filled in the intaglio grooves is left. Referring to FIG. 5, which illustrates a side sectional view of the transfer-type curved surface printing device 1, an elastic transfer pad 6 mounted on a height-adjusting jig for the elastic transfer body is lowered onto the ink left in the intaglio grooves 17 of the intaglio matrix 5 to pick up the ink. The transferring pad 6 is moved to a position above the key board 8 and lowered onto the key board 8 to transfer the ink image to the key board 8.

The key board 8 to which the ink image has been transferred is moved by the conveyer 10 and stops at a position or stage of a heated body covering device 11. A covering body 12 which has been heated by a far infrared heating unit 13 covers the surface of the key board 8 to which the ink image has been transferred. After a predetermined covering time, the covering body 12 is removed from the key board 8 and set in the far infrared heating unit 13. The key board 8 for which the permeation of the ink has been finished by covering with the covering body 12, is moved by the conveyer 10 to a position where it is removed from the conveyer 10.

The above successive steps are described in more detail with reference to FIGS. 2A to 13.

Figures 2A, 2B:
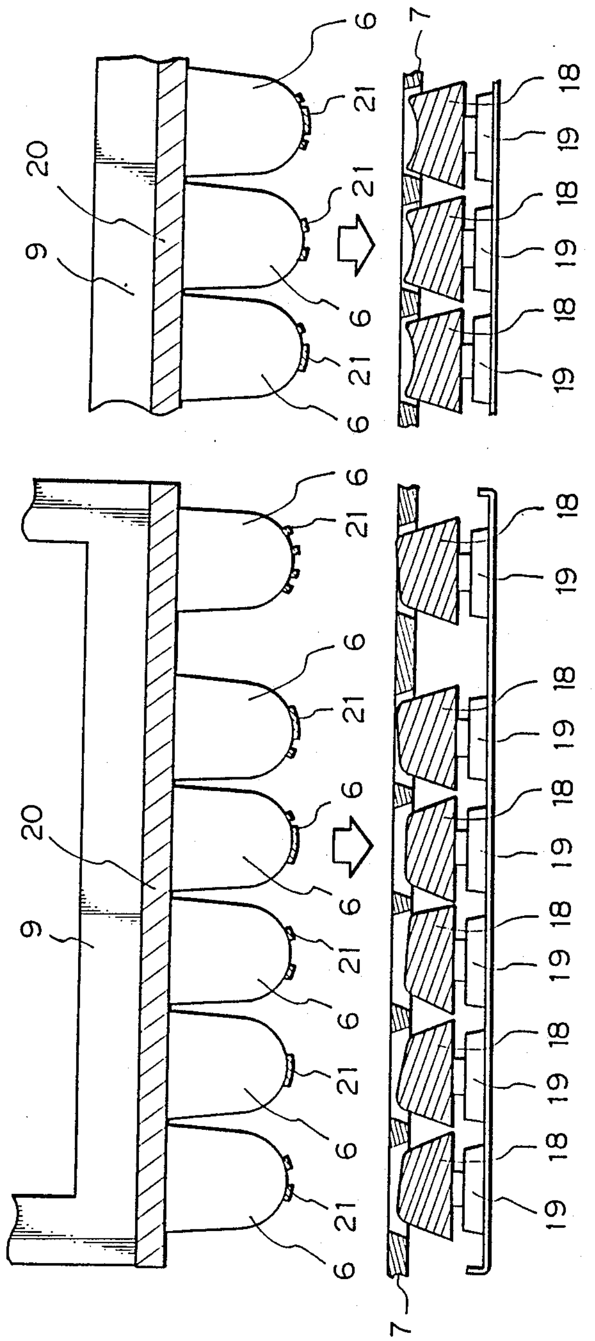
FIGS. 2A, 2B, 3A and 3B illustrate parts of the system of FIG. 1 in steps of ink transferring process.
Figure 3B:
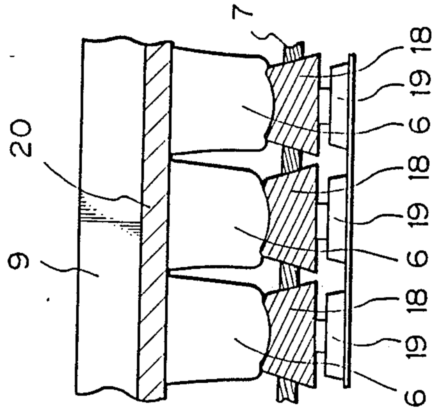
Figure 3A:
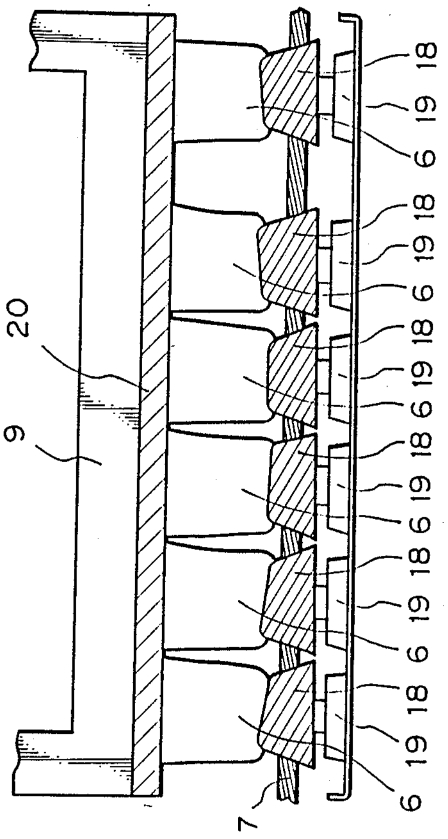

FIGS. 2A, 2B, 3A and 3B illustrate actions of the elastic transfer pad 6 which transfers an ink 21 transferred from the intaglio matrix 6 to key tops 18 of the key board 8. FIGS. 2A and 3A are side sectional views and FIGS. 2B and 3B are front sectional views. The ink 21 is transferred from the ink in the intaglio grooves of the intaglio matrix 5. The material of the elastic transferring pad 6 may be any elastic material to which ink adheres but does not absorb ink, including gelatin, silicone rubber, etc. The shape of the elastic transferring pad 6 is preferably in the form of a cone or has a semispherical transfer surface, and further preferably is at an angle to the surface of an article to which the ink is to be transferred (that is, the transfer surface of the pad is not parallel to the surface of an article to which the ink is to be transferred). When the key tops of an article to be printed have a curved or concave surface, the curved surface of the transfer pad preferably has a curvature smaller than that of the surface of the key tops. If the surface of the transfer pad is parallel to the surface of an article to be printed, or if the surface of the transfer pad has a curvature larger than that of the curved surface of an article to be printed (that is, if the periphery of the surface of a transferring pad comes into contact with the surface of an article before the inner portion of the surface of the transfer pad), air may be entrapped during the transfer, resulting in an incomplete transfer.

A transfer printing of each key top of a key board is possible, but a one shot transfer printing a key board is preferable. When a key board is transfer printed, the shapes of each row of key tops of a key board are different, as seen in FIGS. 2A and 3A, and the heights of the top surfaces of key tops from the bottom of the switches 19 are also different in each row of the key tops. Therefore, transfer printing is preferably conducted by adjusting the height of each row of transfer pads 6 to the height of each row of key tops 18, by adjusting the heights of transfer pads 6 themselves or the thicknesses of transfer pad holders 20 in combination with transfer pads 6 having an equal height. By this adjustment of the heights of the transfer pads 16, the pressures applied to all key tops 18 of a key board when transferred are equal, and thus a uniform transfer is attained for all of the key tops. This is applicable to transfer printing of discrete key tops arranged as a key board. However, since the elastic transfer pad 6 has little elasticity, the transfer pads 6 having a same height absorb any small differences in height of key tops.

Moreover, the top surfaces of key tops 18 of a key board 8 may have different shapes and not all of them are necessary vertical to the pressing direction of the transfer pads 6. When pressed, the key tops 18 ascend by the length of the stroke of a switch. When the top surface of a key top 18 has an angle which is not vertical to the pressing direction of the transferring pad 6, the key top 18 may move in a horizontal direction, depending on the structure of the switch, when transfer printing is carried out. As a result, the printed image is unusable. In such a case, a key board holder 7 is advantageously used. The key board holder 7 is a rigid plate of, e.g., stainless steel or aluminum, in which openings corresponding to the shape of key tops are formed. This key board holder 7 is lowered onto the key tops 18, to fixed them in one position, and the top surfaces of the key tops 18 protrude above the holder 7. The holder 7 also has a function such that, when key tops have top surfaces having a relatively large angle to the direction vertical to the pressing direction of a transfer pad 6, the shapes of the openings of the holder 7 are modified to hold the key tops 18 so that the top surfaces of the key tops 18 are made parallel or more parallel to the main surface of the holder 7. By fixing the key tops 18 with the holder 7, the key tops 18 can not move when the transfer pad 6 is pressed on the key tops 18 for the transfer printing. The holder 7 fixes the key tops 18 prior to pressing of the transfer pad 6 and is operated in conjunction with the movement of the transfer pad 6.

Figure 4:
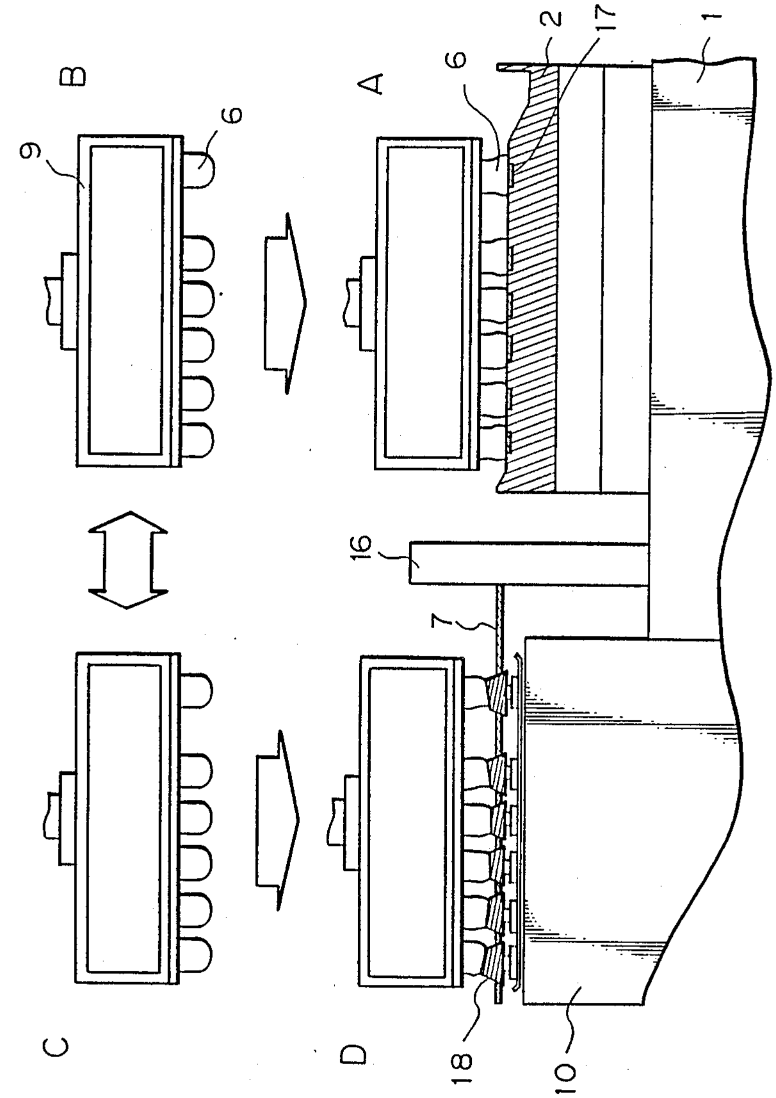
FIG. 4 illustrates the steps of the ink transferring process.

FIG. 4 illustrates successive movements of the elastic transfer pad 6 from the intaglio matrix 5 to the key tops 18. The transfer pad 6 descends from the position B to pick up ink in intaglio grooves 17 on an ink plate 2 (B→A), ascends (A→B), moves above the key tops 18 (B→C), and descends (C→D) and is pressed on the key board 8 to transfer the image-forming ink on the key board 8. Then, the transfer pad 6 again ascends (D→C) and moves above the ink plate 2. The depth of the intaglio grooves 17, although not limited, is generally in a range of 5 μm to 100 μm, preferably in a range of 20 μm to 50 μm. If the depth is less than 5 μm, the amount of ink transferred is small, and thus that coloration of an article which has been permeation printed is unsatisfactory. Even if the depth is more than 100 μm, ink at the bottom portion of the intaglio grooves is not transferred to the transfer pad and only ink near the surface of intaglio grooves is transferred, and thus ink remains in the intaglio grooves, if the intaglio grooves are fine. Accordingly, an advantageous effect is not obtained by intaglio grooves having a depth of more than 100 μm.

The time for moving the transfer pad 6 from the intaglio matrix 5 to the key board 8 (A→B→C→D) is not particularly limited, but is preferably as short as possible since the ink may dry if the time is too long. The passage of the transfer pad 6 from the intaglio matrix 5 to the key board 8 is not particularly limited as long as the transfer pad 6 is pressed onto the intaglio matrix 5 and the key board 8 in the direction vertical thereto.

FIG. 5 illustrates a sectional view of an elastomer transfer-type curved surface printing device 1. The key top holder 7 carried by a key top holder carrier 16 is moved in conjunction with the movement of the transfer pad 6 and descends on the key board 8 to fix all key tops 18 of the key board 8 before the transfer pad 6 is pressed on the key board 8. A key board holder 15 for holding the key board 8 is set onto the conveyer unit 10, and is reciprocated between the transfer type printing device 1 and the heated body covering device 11. The movement of the key board holder 15 is controlled to match the movement of the transfer pad 6, and thus the key board holder 15 moves and reaches the body heating and covering device 11 before the ink is dried.

Then, before the ink is dry, the key tops to which the ink is transferred are covered with a body to make the ink permeate into the key board, in the body heating and covering device. The body heating and covering device 11 as in FIG. 1 is described in more detail below with reference to FIGS. 6A to 10.

Figure 6B:
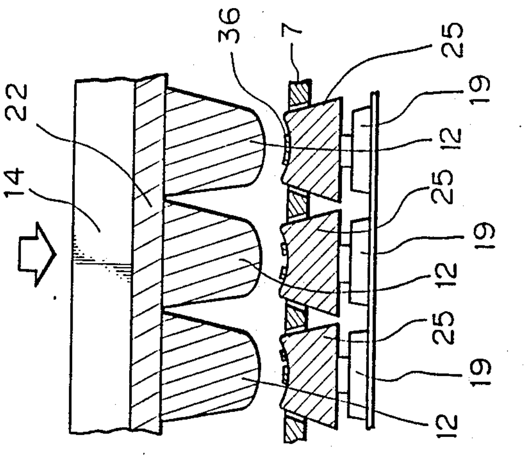
FIGS. 6A, 6B, 7A and 7B illustrate parts of the system of FIG. 5 in steps of covering a shaped surface of a plastic body with a covering body.
Figure 6A:
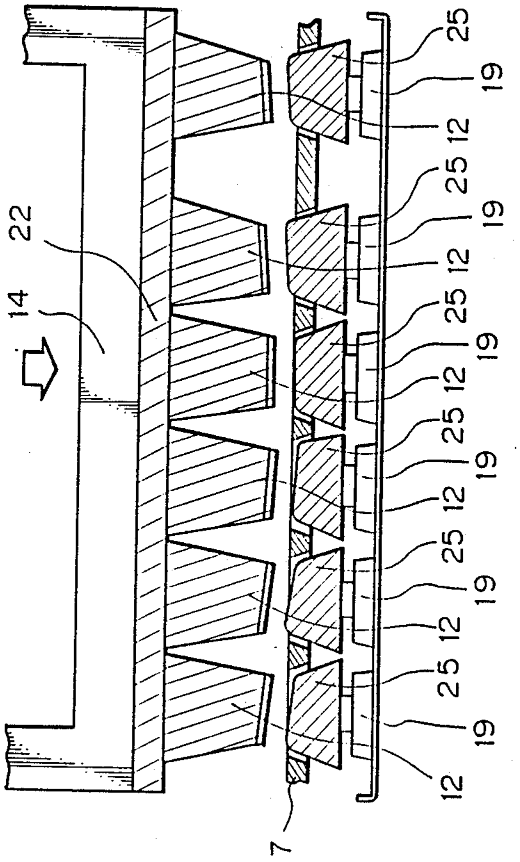
Figure 7B:
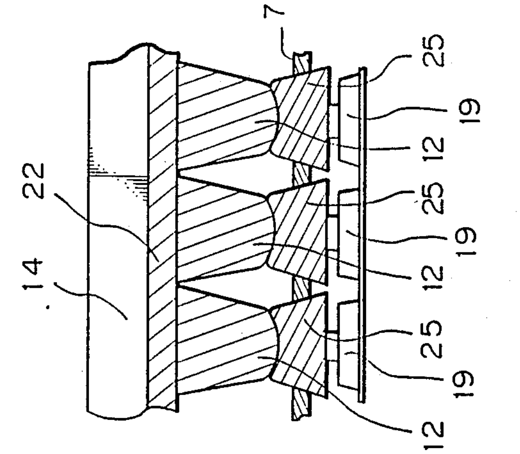
Figure 7A:
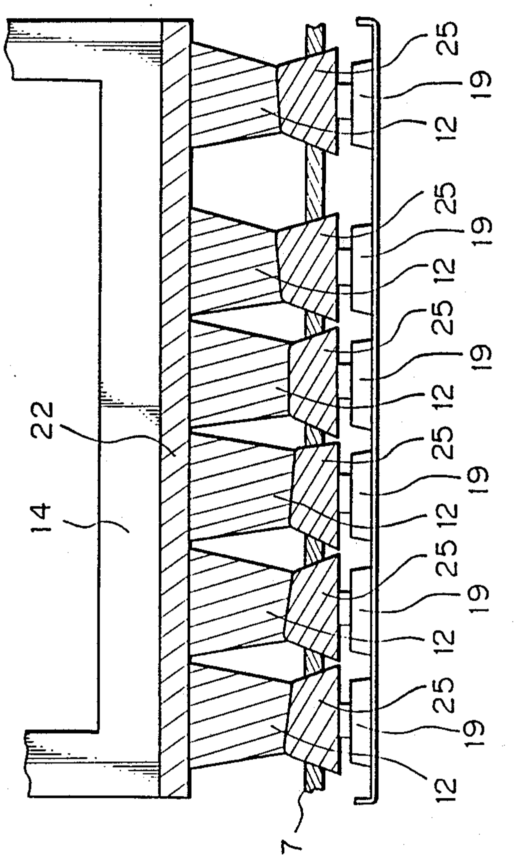
Figure 8A:
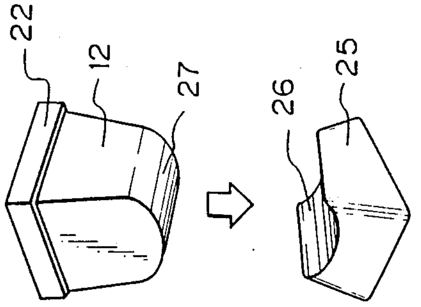
FIGS. 8A, 8B, 8C and 8D illustrate relationships between a shaped surface of a plastic article and a covering body.
Figure 8B:
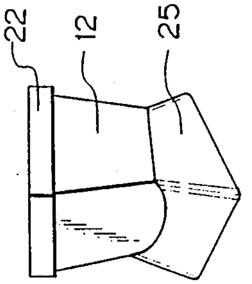
Figure 8C:
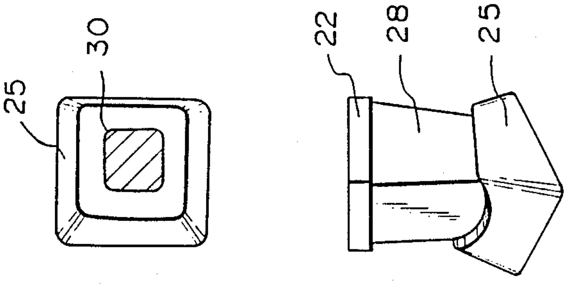
Figure 8D:
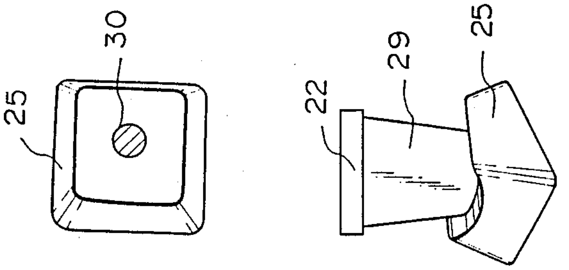

FIGS. 6A, 6B, 7A and 7B illustrate the actions of covering the key tops 25 to which the ink image has been transferred in the transfer-type curved surface printing device 1, with covering bodies 12. FIG. 6A and 6B illustrate the device 11 just before the covering bodies 12 cover the inked key tops, and FIGS. 7A and 7B illustrate the movement that the covering bodies 12 cover the key tops. FIGS. 6A and 7A are side sectional views and FIGS. 6B and 7B are front sectional views. As seen from the series of actions in FIGS. 6A, 6B, 7A and 7B, all key tops 18 of the key board 8 onto which an ink image is transferred are covered almost at the same time. Although the heights of switches 19 of the key tops 25 of a key board 8 are different in each row of key tops, the heights of the covering bodies 12 are adjusted to the heights of the top surfaces of the key tops 25 in each row by the covering body holder 22, as in the preceding transfer-type printing device 1. Moreover, all surfaces of all key tops 1 are covered with the covering bodies 12 at the same time, since the surfaces of the covering bodies 12 are complementary to the surfaces of the key tops 25. In this covering step, the ink transferred onto the key tops 25 first permeates into the body of the key tops 25. The present invention is particularly directed to a system for the permeation printing of a curved surface and in this case, it is essential that the surfaces of the covering bodies are complementary to the surface to be permeation printed. The covering is maintained usually for more than 1 second, as a covering time of less than 1 second does not provide a satisfactory permeation.

A key board holder 7 may be used to prevent a horizontal movement of key tops, as in the transfer-type printing device 1.

FIGS. 8A to 8D illustrate the covering bodies. As seen in these figures, particularly in FIGS. 8A and 8B, a surface 26 of a key top 25 and a surface 27 of a covering body 12 are complementary to each other, and thus these surfaces 26 and 27 come into contact with each other on a plane to plane basis, not point to point. If these surfaces 26 and 27 are not complementary, a portion of the surface 26 of the key top on which ink is transferred may be first covered with the covering body before another portion of the surface 26 is covered with the covering body 12. This coverage delay is momentary, but may cause a movement of ink from a portion of the surface 26 which is covered in advance by the covering body 12 to a portion of the surface 26 which has not been covered with the covering body 12 when ink is not dry due to the large amount of the ink transferred, and when the covering body 12 is hard. Accordingly, the ink transferred to the surface 26 of a key top 25 spills out of the image and ink spreading and an unsatisfactory unclear periphery of the patterns may result. Although the degree of ink spreading and unclear periphery of patterns may be reduced or completely removed by an adjustment of the amount of transferred ink and the hardness of the covering body, the ink spreading and unclear periphery of patterns are removed without adjustment of the above when the surface 27 of the covering body 12 is complementary to the surface 26 of the key top 25 to a degree such that the above-mentioned movement of ink does not occur.

When a pattern or ink image transferred onto the surface of a key top 25 is small compared to the surface of the key top 25, a surface 30 of a covering body 28 or 29 may be small as long as it can cover the pattern or ink image, and thus can be smaller than the surface 26 of the key top 25. (See FIGS. 8C and 8D).

The material of the covering body is not particularly limited. Since the covering body is repeatedly heated and cooled, the covering body preferably has a large heat capacity and is not easily cooled, and thus a material having a large specific heat capacity is suitable. Moreover, since long time resistance to an ink solvent, etc. is necessary, glass, a synthetic rubber, etc. are used. In practice, chloroprene rubber, acrylic rubber, silicone rubber, etc. which also have elasticity, are preferably selected.

Figure 9:
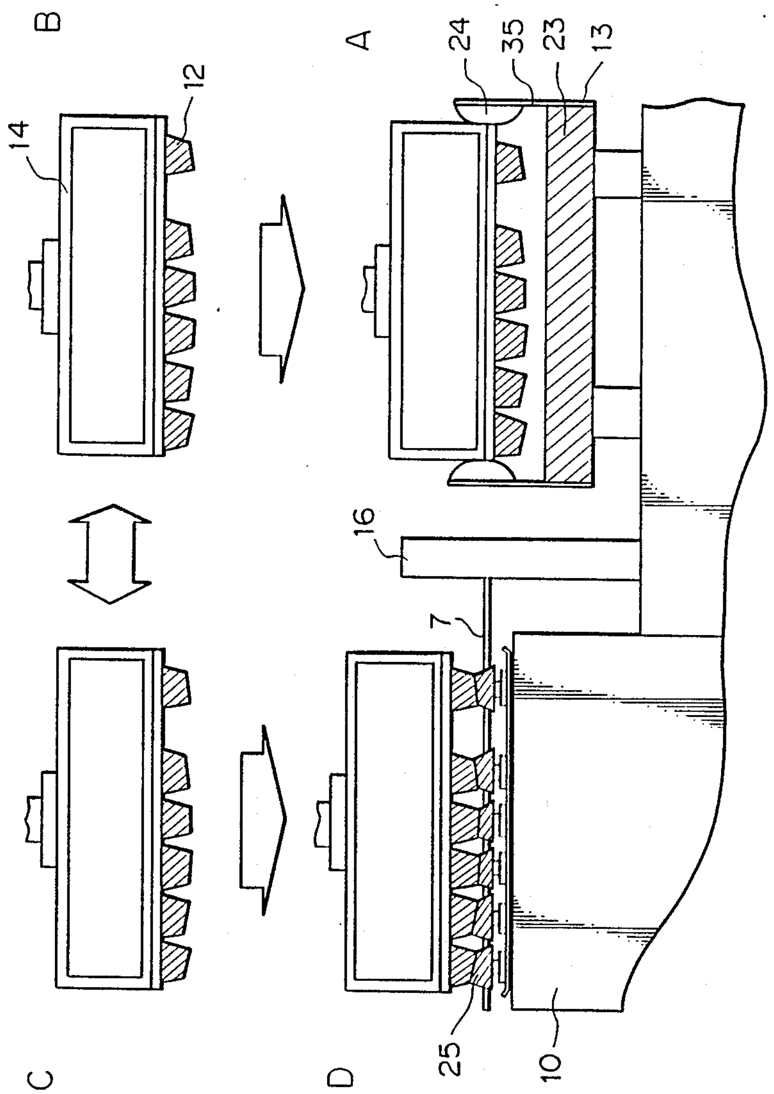
FIG. 9 illustrates the covering steps.

FIG. 9 illustrates successive movements of the covering body 12 between a far infrared heating unit 13 and the key board 8. The far infrared heating unit 13 is used for heating the covering bodies 12. Although heating of the covering bodies 12, 28, 29 is not essential, it is usually effected to accelerate the permeation of the ink. To obtain a uniform permeation, the surfaces of the covering bodies 12 preferably are brought to a uniform temperature. The heating means is not limited to a far infrared heating unit. A far infrared heating allows heating of different covering bodies adopted for different sizes of key boards and different shapes of key tops, by using a relatively large far infrared radiant body 23, which is a radiation heating type unit. Heat conduction type heating, in which the covering body 12 is brought into contact with a high temperature body, does not allow a uniform heating of the covering bodies 12 when the size of key board or shapes of the respective key tops are altered. When heating is unnecessary, the surfaces of respective covering bodies 12 in a room would have a uniform temperature. However, when heating is necessary, the temperatures of the top surfaces of respective covering bodies 12 are not made precisely equal, since the far infrared heater provides a radiation heating, but declined angles of the top surfaces of the covering bodies 12 are different in each row of the key tops and a far infrared reflection surface 35 does not have a reflection coefficient of 100%. Therefore, the temperatures of the surfaces of the covering bodies 12 should be made as equal as possible by adjusting a distance between the covering bodies 12 and a far infrared radiator 23 (a holder of a jig for adjusting the height of the covering bodies is denoted by the reference numeral 24) and/or by adjusting the amount of far infrared radiation and/or by other means. The passage of the covering bodies 12 from the far infrared radiating unit 13 to the key board 8 is not particularly limited, but the time for transfer of the covering bodies 12 is preferably as short as possible when the covering bodies 12 are heated. This is because the temperature of the surface of the covering bodies 12 falls during the movement thereof, which means that the covering bodies 12 must be reheated.

Figure 10:
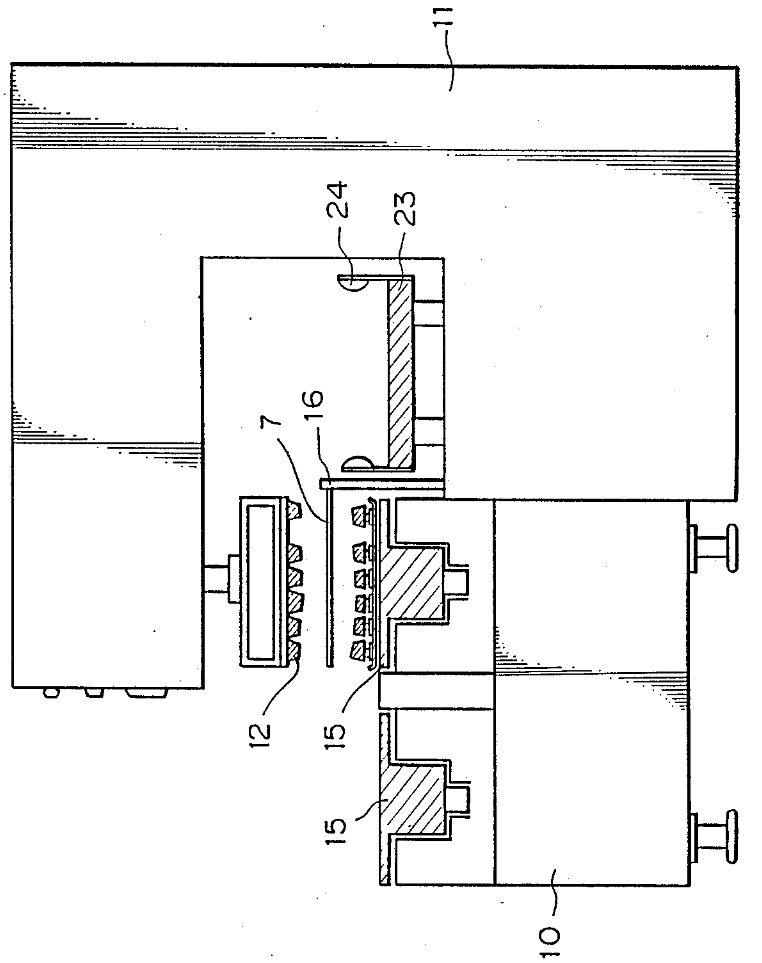
FIG. 10 is a sectional view of a device for covering a shape surface of a plastic article with a heated covering body.
Figure 12A:
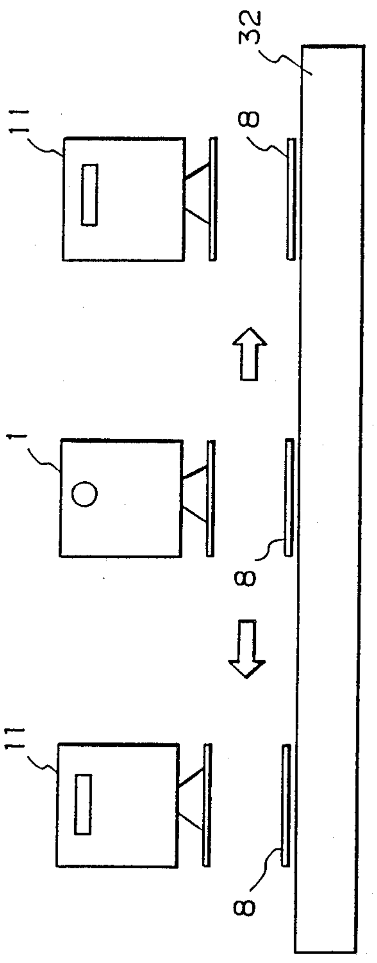

FIG. 10 illustrates a section of the body heating and covering device 11. The key top holder 7 held by a holder 16 of a key top holder is moved in conjunction with the movement of the covering bodies 6 and is lowered to fix the key tops prior to the covering of the key board 8 with the covering bodies 12. A key board holder 15, to which the key board 8 is fixed, is set to a conveyer unit 10 and is reciprocated between the transfer-type printing device 1 and the body heating and covering device 11.

FIGS. 11A and 11B, and 12A and 12B illustrate front and plan views of arrangements of the transfer-type curved surface printing device 1 and the body heating and covering device(s) 11. In a system for permeation printing according to the present invention, the conveyer 31 stops at two positions or stages, i.e., the first stop is at a position where a key board 8 is transfer-printed by a transfer-type printing device 1, and the second stop is at a position where the key board 8 to which ink has been transferred is covered with a covering body by a body heating and covering device 11. The times for stopping at the above two positions may be the same or different. When the times for stopping at the two positions are different, preferably a plurality of devices which take a longer time are advantageously arranged with a single device which takes a shorter time to increase the efficiency.

When the time for the covering is longer than that for the transfer, a plurality of body heating and covering devices 11 are preferably arranged at each transfer-type printing device 1 so that transfer printing can be repeated in the time necessary for carrying out the transfer printing, which is a shorter time than the time for covering. If the time for transfer printing is longer than that for covering, a plurality of transfer-type printing devices 11 are similarly arranged at each body heating and covering device 1.

Figure 11A:
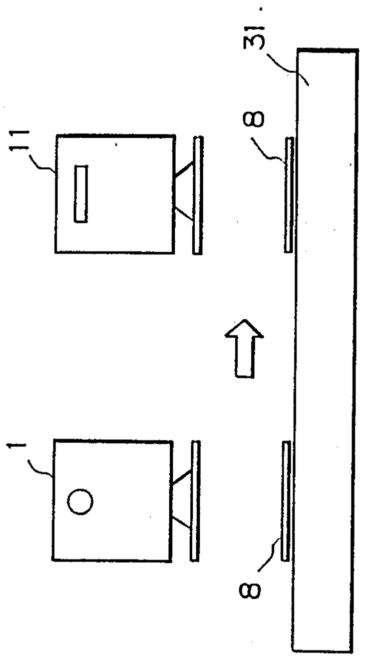
FIGS. 11A, 11B, 12A, 12B and 13 illustrate arrangements of a system comprising a device for transferring an ink image and one or two devices for covering a plastic article.
Figure 11B:
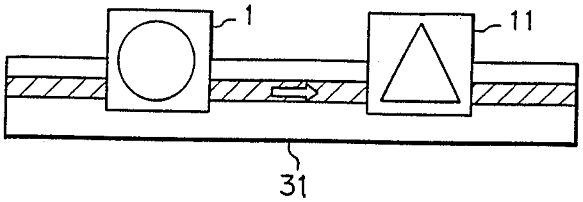
Figure 12B:
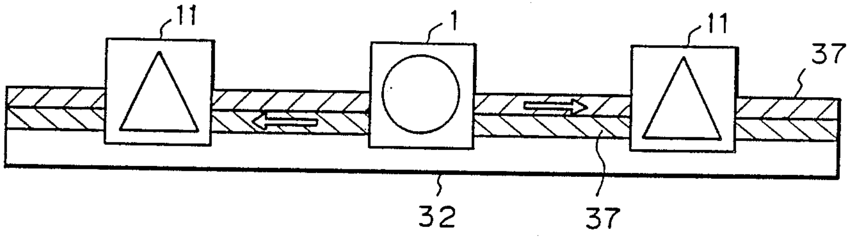
Figure 13:
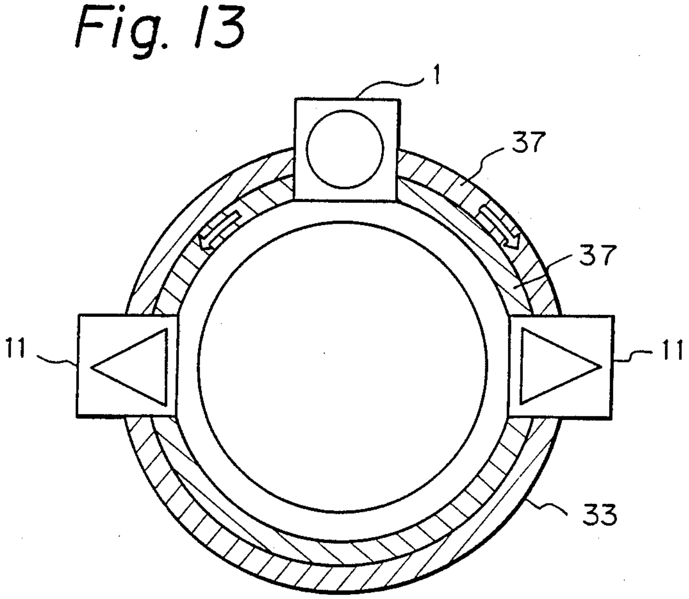

The arrangement of respective devices may be linear as in FIGS. 11B and 12B or in a circle as in FIG. 13. A plurality of lines 37 of conveyers 10 are arranged such that a plurality of key boards mounted on the lines 37 of the conveyers 10 do not cross each other and the conveyers 10 move in different directions in the respective lines 37 of the conveyers 10.

For example, in a system in which two body heating and covering devices 11 are arranged at each transfer-type printing device 1, two lines 37 of conveyers 10 are arranged as in FIGS. 12B and 13. In these cases, the transfer-type printing device 1 should conduct printing a key board at two positions on the two lines 37 of conveyers 10. A key board 8, when transfer-printed by a transfer-type printing device 1, is selectively delivered to either of the body heating and covering devices 11, where the key board 8 is covered with a covering body to obtain a finished product.

The above operation is preferably conducted automatically, although conveying key boards may be conducted manually, particularly in a system having one transfer-type printing device and one body heating and covering device.

EXAMPLES

The present invention, particularly a process permeation printing a stylene-based resin article, is described in detail below with reference to examples although they do not limit the invention at all. The percent and part in Examples are based on the weight.

Example 1

Key tops for a computer supply were used as a stylene-based resin article. The key top articles were prepared by molding an ABS resin "Denka ABS GR-2000", manufactured by Denki Kagaku Kogyo K. K., in a mold for forming twelve key tops ($18\times18\times12^h$ m/m) in an injection molding machine TS-50, provided by Nissei Jushi Kogyo K. K.

An ink having a composition shown in Table 1 was mixed with butylcellosolve having a solubility parameter of 10.5 $(cal/cc)^{\frac{1}{2}}$ at a volume ratio of 1:1 to prepare an ink for printing used in this Example. The solubility parameter $\delta$ of this mixed mediums was 10.0 $(cal/cc)^{\frac{1}{2}}$.

The printing method was silk screen printing. After printing surfaces of key tops in a silk screen printing machine, the printed surfaces of the key tops were soon covered with covering materials shown in Table 2 which have been previously heated to 120° C. by an environmental text machine PSL-2G provided by Tabai Espec K. K. and thus the ink was made permeate into the key tops. The time periods for covering were 45 seconds in all cases.

The obtained permeation printed key tops were checked with a depth of permeation of ink and a wear resistance of print. The methods for determining them are as below, which were applied to all following Examples.

Permeation depth:

A key top, into which an ink has been made permeate, is dipped into liquid nitrogen to lower the temperature of the key top of a resin to a temperature lower than the glass transformation temperature Tg of the resin. The key top is then broken through printed patterned such as a letter, a mark or a figure, the section of which is observed by a universal tool microscope TUM-200BD sold by Tokyo Kogaku Kikai K. K, to determine a depth of ink permeated. A key top having a depth of permeated ink of more than 300 μm is designated A; a key top having an ink depth of 200 μm to 300 μm is designated B; a key top having an ink depth of 100 μm to 200 μm is designated C; and a key top having an ink depth of less than 100 μm is designated D.

Wear Resistance:

A grinding wheel with a grinding stone (No. 400, regular fused alumina, 8 mmφ) is mounted to a mirror machine EPM-1B sold by Tokiwa Seiki Kogyo K. K. A key top is placed below the grinding stove and ground under the conditions of 0.5 kg of weight and 0.5 scale of amplitude until some letter printed disappears, which time period is measured. A key top having a measured time period of more than 600 seconds is designated A; a key top having a measured time period of 600 to 300 seconds is designated B; and a key top having a measured time period of less than 300 seconds is designated C.

TABLE 1

Composition of Ink

| Composition | Volume content (%) |
|---|---|
| Solvent: | |
| toluen | 0.5 |
| butylcellosolve | 45 |
| chlorobenzene | 4.5 |
| polymer: | |
| polyester-type urethane or ethylcellosolve | |
| Dye: | 50 |
| azoic dye | |

TABLE 2

| Sample No. | Example 1 1 | 2 | 3 | 4 | 5 | 6 | 7 | 8 |
|---|---|---|---|---|---|---|---|---|
| Covering material | silicone rubber | glass | mortar cement | fluorene resin | iron plate | galvanized sheet metal | aluminum plate | tile |
| permeation temperature (°C.) | 120 | 120 | 120 | 120 | 120 | 120 | 120 | 120 |
| permeation depth | A | A | A | A | A | A | A | A |
| wear resistance | A | A | A | A | A | A | A | A |

As seen from Table 2, the covering material is not particularly limited and by any covering material, the printed ink permeated to a depth of more than 300 μm and it took more than 600 seconds to make a letter of ink disappear in the wear resistance test with a mirror machine. Thus, every material was satisfactorily effective as a covering material.

Example 2

Each of styrene-based resins having compositions shown in Table 3 was mixed in a Henschel mixer and fed into a vent-provided single screw-type extruder VC-40, manufactured by K. K. Chuo Kikai Seisakusho, to prepare pellets thereof. Using the obtained pellets, key tops were molded in the same mold as in Example 1, silk screened, and covered with a glass coating to permeate a printed ink, followed by measuring the permeation depth and the wear resistance. The results are shown in Table 4.

TABLE 3

| Sample No. | Component styrene (%) | α-methylstyrene (%) | polybutadiene rubber (%) | SBR rubber (%) | acrylonitrile (%) | methylmeth-acrylonitrile (%) | N-phenyl maleic imide (%) |
|---|---|---|---|---|---|---|---|
| A-1 | 100 | 0 | 0 | 0 | 0 | 0 | 0 |
| A-2 | 95 | 0 | 5 | 0 | 0 | 0 | 0 |
| A-3 | 35 | 0 | 50 | 0 | 15 | 0 | 0 |
| A-4 | 35 | 0 | 40 | 10 | 15 | 0 | 0 |
| A-5 | 70 | 0 | 0 | 0 | 30 | 0 | 0 |
| A-6 | 35 | 0 | 40 | 0 | 15 | 10 | 0 |
| A-7 | 0 | 70 | 0 | 0 | 30 | 0 | 0 |
| A-8 | 20 | 41 | 0 | 0 | 19 | 0 | 20 |
| A-9 | 40 | 0 | 10 | 0 | 0 | 50 | 0 |

TABLE 4

| Sample No. | Example 2 8 | 9 | 10 | 11 | 12 | 13 |
|---|---|---|---|---|---|---|
| Resin | A-1 | A-2 | A-5 | A-7 | A-8 | A-9 |
| Permeation temperature (°C.) | 120 | 120 | 120 | 120 | 120 | 120 |
| Permeation depth | C | B | B | B | C | B |

TABLE 4-continued

| Sample No. | Example 2 8 | 9 | 10 | 11 | 12 | 13 |
|---|---|---|---|---|---|---|
| Wear resistance | B | B | B | B | B | A |

Example 3

Compositions comprising resin A-one of the resins (A-3), (A-4) and (A-6)-with the resins (A-5) and (A-7) as shown in Table 5 were mixed respectively, then pelletized, and molded to form key tops, which were printed and covered with glass to permeate ink in the same manner as in Example 2. The results of measurements of the permation depth and the wear resistance are also shown in Table 5.

TABLE 5

| | Example 3 14 | 15 | 16 | 17 | 18 | 19 | 20 | 21 |
|---|---|---|---|---|---|---|---|---|
| Main Resin A | (A-3) | (A-3) | (A-3) | (A-4) | (A-4) | (A-6) | (A-6) | (A-6) |
| Amount of Resin A added (part) | 45 | 60 | 30 | 50 | 35 | 30 | 40 | 40 |
| Amount of (A-5) added (part) | 55 | 40 | 40 | 50 | 25 | 50 | 0 | 60 |
| Amount of (A-7) added (part) | 0 | 0 | 30 | 0 | 40 | 20 | 60 | 0 |
| Permeation temperature (°C.) | 120 | 120 | 120 | 120 | 120 | 120 | 120 | 120 |
| Permeation depth | B | A | B | A | B | B | B | B |
| Wear resistance | B | B | B | A | B | B | A | B |

In all samples, satisfactory permeation depths and wear resistance were obtained as in Example 2.

Example 4

Two parts by weight of a silicone oil of KF96 having a viscosity of 1000 cp (B-1) or KF96E having a viscosity of 500 cp (B-2), both sold by Shinetsu Kagaku K. K. was added to the samples Nos. 14, 15, 17 and 21 respectively and pelletized. Then key tops were molded and coated as in Example 1 but the coating material was glass. The results of measurements of the permeation depth and the wear resistance are shown in Table 6.

TABLE 6

| | Example 4 | | | | | | | |
|---|---|---|---|---|---|---|---|---|
| | 22 | 23 | 24 | 25 | 26 | 27 | 28 | 29 |
| Resin A | (A-3) | (A-3) | (A-3) | (A-3) | (A-4) | (A-4) | (A-6) | (A-6) |
| Amount of resin A added (part) | 45 | 45 | 60 | 60 | 50 | 50 | 40 | 40 |
| Amount of (A-5) added (part) | 55 | 55 | 40 | 40 | 50 | 50 | 60 | 60 |
| Resin B | (B-1) | (B-2) | (B-1) | (B-2) | (B-1) | (B-2) | (B-1) | (B-2) |
| Amount of resin B added (part) | 2 | 2 | 2 | 2 | 2 | 2 | 2 | 2 |
| Permeation temperature (°C.) | 120 | 120 | 120 | 120 | 120 | 120 | 120 | 120 |
| Permeation depth | C | B | C | B | C | B | B | B |
| Wear resistance | A | A | A | A | A | A | A | A |

As seen in Table 6, the results of the samples 14, and 16 demonstrate improvement of the wear resistance by addition of a silicone oil.

Example 5

Example 1 were repeated, but a solvent mixed with the ink in Table 1 was solvent A to I shown in Table 7 and a coating material was glass.

The results are shown in Table 8.

TABLE 7

| | Composition | Content (vol %) | Solubility parameter $(cal/cc)^{1/2}$ | X |
|---|---|---|---|---|
| A | butanol | 100 | 11.4 | 10.45 |
| B | cyclohexane | 100 | 8.2 | 8.85 |
| C | ethyl acetate | 100 | 9.1 | 9.3 |
| D | cyclohexane | 22.9 | | |
| | iso-propanol | 5.0 | | |
| | ethyl acetate | 29.4 | | |
| | n-butanol | 15.2 | | |
| | ethyl cellosolve | 18.2 | | |
| | butyl cellosolve | 9.3 | | |
| | | mixed sample | 9.66 | 9.58 |
| E | methyl isobutyl keton | 0.8 | | |
| | methanol | 4.4 | | |
| | ethyl acetate | 24.7 | | |
| | butanol | 48.2 | | |
| | ethylcellosolve | 4.5 | | |
| | butylcellosolve | 12.9 | | |
| | xylene | 6.3 | | |
| | isopropyl acetate | 1.2 | | |
| | | mixed sample | 10.8 | 10.15 |
| F | methyl isobutyl keton | 10.0 | | |
| | ethyl acetate | 34.3 | | |
| | iso-propanol | 1.8 | | |
| | butanol | 22.4 | | |
| | n-heptan | 20.9 | | |
| | cellosolve acetate | 10.6 | | |
| | | mixed sample | 8.81 | 9.16 |
| G | acetone | 2.7 | | |
| | ethyl acetate | 30.2 | | |
| | n-butyl acetate | 3.5 | | |
| | butanol | 6.7 | | |
| | butyl cellosolve | 0.2 | | |
| | toluene | 56.7 | | |
| | | mixed sample | 9.14 | 9.32 |
| H | n-butyl cellosolve | 23.8 | | |
| | butanol | 54.3 | | |
| | butyl cellosolve | 21.9 | | |
| | | mixed sample | 10.16 | 9.83 |
| I | ethyl acetate | 10.3 | | |
| | n-butyl acetate | 10.0 | | |
| | methanol | 10.4 | | |
| | iso-propanol | 25.2 | | |

TABLE 7-continued

| Composition | Content (vol %) | Solubility parameter $(cal/cc)^{1/2}$ | X |
|---|---|---|---|
| butanol | 20.4 | | |
| butyl cellosolve | 1.8 | | |
| benzene | 0.3 | | |
| toluene | 16.0 | | |
| xylene | 5.6 | | |
| | mixed sample | 10.62 | 10.06 |

TABLE 8

| | Example 5 | | | | | | | | | Example 6* | Example 7* |
|---|---|---|---|---|---|---|---|---|---|---|---|
| Sample No. | 32 | 33 | 34 | 35 | 36 | 37 | 38 | 39 | 40 | 30 | 31 |
| Solvent | A | B | C | D | E | F | G | H | I | n-decane | methanol |
| Permeation temperature (°C.) | 120 | 120 | 120 | 120 | 120 | 120 | 120 | 120 | 120 | 120 | 120 |
| permeation depth | B | B | B | A | A | A | A | A | A | D | D |
| wear resistance | B | B | B | A | A | A | A | A | A | C | C |

*Examples 6 and 7 are comparative

Examples 6 and 7

(Comparative)

Example 1 was repeated, but solvents of n-decane having a solubility parameter δ of 6.6 $(cal/cc^{1/2})$ and methanol having a solubility parameter of 14.5 $(cal/cc)^{1/2}$ were used, which formed inks having solubility parameters of mixed solvent of 8.05 $(cal/cc)^{1/2}$ and 12.0 $(cal/cc)^{1/2}$ respectively.

The results are shown in Table 8.

As seen in Table 8, key tops printed with an ink medium having a solubility parameter of smaller than 8.5 $(cal/cc)^{1/2}$ or larger than 11.5 $(cal/cc)^{1/2}$ had a shallow permeation depth and a less wear resistance, which are not suitable for practical key tops. In contrast, with an ink solvent having a solubility parameter in a range of 8.5 to 11.5 $(cal/cc)^{1/2}$, key tops having a deep permeation depth and a high wear resistance can be obtained according to the present invention.

Example 8

Example 1 was repeated, but the coating material was glass, the ink solvent was butyl cellosolve (solubility parameter of 10.5 $(cal/cc)^{1/2}$), and the permeation temperatures was 70° C. and 170° C.

The results are shown in Table 9.

TABLE 9

| | Example 8 | | | | Example 9* |
|---|---|---|---|---|---|
| Sample No. | 42 | 43 | 44 | 45 | 41 |
| solvent | butyl cellosolve | | | | |
| permeation temperature (°C.) | 70 | 170 | 70 | 170 | 200 |
| permeation depth | B | A | B | A | A |
| wear resistance | B | A | B | A | B |

TABLE 9-continued

| | Example 8 | | | | Example 9* |
|---|---|---|---|---|---|
| Sample No. | 42 | 43 | 44 | 45 | 41 |
| permeation time (sec) | 120 | 30 | 120 | 30 | 30 |

*Example 9 is comparative.

Example 9

(Comparative)

Example 8 was repeated but the permeation temperature was 200° C.

Although the permeation depth was deep, the key tops were thermally deformed which cannot be practically used.

Example 10

Permeation was effected by an autoclave. Key tops were printed with an ink in the manner of Example 1 and then placed in an autoclave without coating the printed surface of the key tops. The autoclave was previously heated to a predetermined temperature. The permeation depth and the wear resistance of the resultant key tops were estimated.

The results are shown in Table 10.

TABLE 10

| | Example 10 | | | | | |
|---|---|---|---|---|---|---|
| Sample No. | 46 | 47 | 48 | 49 | 50 | 51 |
| Resin A | A-1 | A-2 | A-5 | A-7 | A-8 | A-9 |
| Permeation temperature (°C.) | 70 | 70 | 70 | 120 | 120 | 120 |
| Permeation depth | C | B | B | B | C | B |
| Wear resistance | B | B | B | B | B | A |

The results of Example 10 were equivalent to those of Example 2. That is, it was demonstrated that permeation may be conducted in any manner which prevents evaporation of ink, including closing in an autoclave, as long as an ink solvent used has a solubility parameter defined according to the present invention, i.e., in a range of 8.5 to 11.5 $(cal/cc)^{\frac{1}{2}}$.

Example 11

Example 10 was repeated, but nitrogen gas was introduced into the autoclave simultaneously when the key tops were placed in the autoclave, so that permeation was conducted under pressure. The partial pressure of the nitrogene gas was 6.5 $kg/cm^2$ at 70° C., and 8.5 $kg/cm^2$ at 120° C.

The results are shown in Table 11.

TABLE 11

| | Example 11 | | | | | | |
|---|---|---|---|---|---|---|---|
| Sample No. | 52 | 53 | 54 | 55 | 56 | 57 | 58 |
| Resin A | A-1 | A-2 | A-5 | A-7 | A-8 | A-9 | A-8 |
| Resin B | None | None | None | None | None | None | B-2 |
| Permeation temperature (°C.) | 70 | 70 | 70 | 120 | 120 | 120 | 120 |
| Permeation depth | C | C | C | C | C | C | B |
| Wear resistance | B | B | B | B | B | A | A |

In Table 11, the amount of the resin B added was 2 parts by weight to 98 parts by weight of the resin A in the sample 58. Although the permeation depthes in Example 11 were slightly reduced in comparison with those of Example 10, all permeation depths in Example 11 are satisfactory for practical use.

Example 12

Figure 14A:
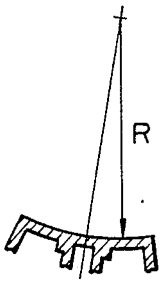
FIGS. 14A and 14B are sectional views of a key top used in FIG. 12.
Figure 14B:
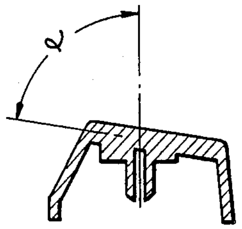

Permeation printing was carried out using a system for permeation printing shown in FIGS. 1 to 13. The shaped article to be permeation printed was a key board for a computor, the key board comprising a number of key tops which have different curvatures R of the top surfaces and differnt angles α to the direction of pressing of a printing pad and covering bodies (see FIGS. 14A and 14B). The covering bodies had covering surfaces complementary to the top surfaces of the key tops of the key board.

In all samples, the depth of the letter-forming intaglio grooves was 35 μm, the width of the letters of the grooves was 0.30 mm, the covering bodies were made of a silicone rubber, the temperature of the covering bodies when covering the key tops was 160° C., and the time for covering the key tops by the covering bodies was 10 seconds.

Figure 15A:
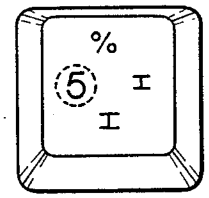
FIGS. 15A, 15B and 15C show patterns of a letter printed in FIG. 14.
Figure 15B:
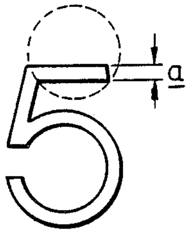
Figure 15C:
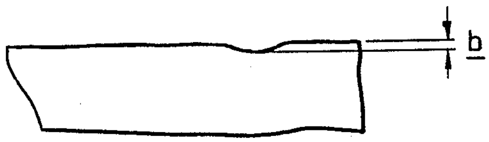

Examples of the letters printed are seen in FIGS. 15A to 15C in which the letter "5" of the key top in FIG. 15A is enlarged to the letter "5" in FIG. 15B which is then enlarged to a part of the letter "5" in FIG. 15C. The width of the letter printed is denoted by a and the width of blur of the letter after permeation is denoted by b.

The results are shown in Table 12.

TABLE 12

| | Example 12 | | | | | | | | | Example 13* | | | |
|---|---|---|---|---|---|---|---|---|---|---|---|---|---|
| Sample No. | 59 | 60 | 61 | 62 | 63 | 64 | 65 | 66 | 67 | 68 | 69 | 70 | 71 |
| Curvature of top surface R (mm) | ∞ | 22 | 22 | 22 | 42 | 68 | 100 | 140 | 140 | ∞ | 22 | 22 | 100 |
| Angle of top surface to direction of pressing α (degree) | 90 | 90 | 84.5 | 81.5 | 84.5 | 84.5 | 84.5 | 84.5 | 90 | 0.30 | 84.5 | 0.06 | 84.5 |
| Width of letter printed a (mm) | 0.30 | 0.30 | 0.30 | 0.30 | 0.30 | 0.30 | 0.30 | 0.30 | 0.30 | 0.30 | 0.30 | 0.30 | 0.30 |
| Width of blur after permeation b (mm) | 0.01 | 0.01 | 0.01 | 0.01 | 0.01 | 0.01 | 0.01 | 0.01 | 0.01 | 0.05 | 0.04 | 0.06 | 0.05 |

*Example 13* is comparative.

Example 13

Example 12 was repeated, but the covering bodies had a semisphere with a same curvature R of 10 mm were used.

Example 14

Example 12 was repeated, but the depth of the intaglio grooves, the width of the letters of the intaglio grooves, and the surface temperature of the covering bodies were altered. The key board was same as that of sample 61 of Example 12.

The results are shown in Table 13. It is seen in Table 13, according to the present invention, permeation printing of styrene-based key tops having a concave surface can be done allowing a less blur of the printed patterns, such as less than 0.03 mm, even less than 0.02 mm or 0.015 mm. A blur of even less than 0.01 mm is possible by properly selected conditions.

TABLE 13

| | Example 14 | | | | | | | Example 15* | |
|---|---|---|---|---|---|---|---|---|---|
| Sample No. | 72 | 73 | 74 | 75 | 76 | 77 | 78 | 79 | 80 |
| Depth of intaglio groove (μm) | 25 | 35 | 50 | 50 | 80 | 80 | 120 | 35 | 120 |
| Width of letter of intaglio groove (mm) | 0.3 | 0.3 | 0.3 | 0.3 | 0.7 | 0.7 | 1.0 | 0.3 | 0.1 |
| Surface temperature of covering body (°C.) | 160 | 160 | 120 | 160 | 120 | 160 | 160 | 160 | 160 |
| Covering time (sec) | 10 | 10 | 30 | 30 | 30 | 30 | 60 | 0.3 | 60 |
| Depth of permeation (μm) | 25 | 50 | 53 | 67 | 73 | 98 | 130 | 5 | 35 |

*Example 15 is comparative.

Example 15

(Comparative)

Example 14 was repeated, but for comparison, the covering time was shortened in a sample and letter-forming intaglio grooves having an extremely narrow width of the letter in comparison to a depth of the grooves were used in another sample.

The results are shown in Table 13.

We claim:

1. A permeation printed resin body comprising: a styrene-based resin body having a shaped surface, manufactured by forming an ink image on the shaped surface of the styrene-based resin body with an ink comprising oil-soluble dye and a solvent having a solubility parameter in a range of 9.5 to 10.5 (cal/cc)$^{\frac{1}{2}}$, and causing the ink to permeate into the styrene-based resin body, said printed styrene-based resin body comprising an image-forming ink permeated from the shaped surface into the resin body, the depth of permeation of the dye being at least 20 μm.

2. A printed resin body according to claim 1, wherein said depth of permeation of the ink is at least about 30 μm.

3. A printed resin body according to claim 1, wherein said depth of permeation of the ink is at least about 100 μm.

4. A printed resin body according to claim 1, wherein said depth of permeation of the ink is at least about 200 μm.

5. A printed resin body according to claim 1, wherein said depth of permeation of the ink is in a range of 30 μm 100 μm.

6. A printed resin body according to claim 1, wherein said dye is a sublimating substance.

7. A printed resin body according to claim 1, wherein the styrene-based resin is an acrylonitrile-butadiene-styrene copolymer resin.

8. A printed resin body according to claim 1, wherein the printed resin body is a key top.

9. A printed resin body according to claim 8, wherein said key top has a concave shaped surface from which the ink permeated into the resin body and a pattern of said image-forming dye has a width of a blur less than 0.03 mm.

10. A printed resin body according to claim 9, wherein the width of the blur of the pattern is less than 0.02 mm.

11. A printed resin body according to claim 10, wherein the width of the blur of the pattern is less than 0.015 mm.

* * * * *